United States Patent
Le et al.

(10) Patent No.: US 12,093,969 B2
(45) Date of Patent: Sep. 17, 2024

(54) MULTI-MODAL REGRESSION TO PREDICT CUSTOMER INTENT TO CONTACT A MERCHANT

(71) Applicant: Capital One Services, LLC, McLean, VA (US)

(72) Inventors: Minh Le, Bentonville, AR (US); Rui Zhang, New York, NY (US); Erik Mueller, Chevy Chase, MD (US); Victor Alvarez Miranda, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 402 days.

(21) Appl. No.: 17/356,084

(22) Filed: Jun. 23, 2021

(65) Prior Publication Data

US 2022/0414684 A1    Dec. 29, 2022

(51) Int. Cl.
*G06Q 30/0201* (2023.01)
*G06F 17/18* (2006.01)
*G06F 18/2431* (2023.01)
*G06N 3/08* (2023.01)

(52) U.S. Cl.
CPC ......... *G06Q 30/0201* (2013.01); *G06F 17/18* (2013.01); *G06F 18/2431* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 7,427,033 B1 * | 9/2008 | Roskind | G07F 7/1083 235/487 |
| 9,467,567 B1 * | 10/2016 | Barkan | G06Q 10/06 |
| 10,402,737 B1 | 9/2019 | Malalel et al. | |
| 10,652,117 B2 | 5/2020 | Burg et al. | |
| 10,680,979 B2 | 6/2020 | Karp et al. | |
| 2016/0005049 A1 * | 1/2016 | Menezes | G06Q 10/0635 705/7.28 |
| 2020/0074312 A1 | 3/2020 | Liang et al. | |
| 2020/0162612 A1 | 5/2020 | Mullane et al. | |
| 2022/0147863 A1 * | 5/2022 | Chawla | G06N 20/00 |

OTHER PUBLICATIONS

Dong, Cailing. Advances in customer intent prediction & pattern discovery. Oct. 14, 2020. capitalone.com. Retrieved Apr. 30, 2024 (Year: 2020).*

* cited by examiner

*Primary Examiner* — Cory W Eskridge
(74) *Attorney, Agent, or Firm* — Sterne, Kessler, Goldstein & Fox P.L.L.C.

(57) ABSTRACT

Provided herein are systems and methods for using multi-modal regression to predict customer intent to contact a merchant. Multi-modal data including numerical data and unstructured data are extracted from customer interactions with the merchant. Features of the numerical data and the unstructured data are separately extracted and classified using techniques specific to the data types. The features for each type are then separately used to predict probabilities of customer intent. A neural network is used to combine the predictions into a single set of estimates of customer intent. This set of estimates of customer intents is used to estimate a probability that the customer will contact the merchant. The customer is then contacted based on the estimate.

21 Claims, 4 Drawing Sheets

MULTI-MODAL REGRESSION TO PREDICT CUSTOMER INTENT TO CONTACT A MERCHANT

BACKGROUND

Businesses, such as online merchants and financial institutions, provide help services to allow customers to reach out for assistance in resolving issues or concerns. Help services can include call centers as well as automated services that have been developed to reduce costs and to allow customers to solve their own problems. Some help services attempt to proactively reach out to customers and help the customer resolve anticipated issues. In order to accurately predict when to reach out to a customer, businesses must identify and utilize different types of data.

BRIEF SUMMARY

Disclosed herein are systems, methods and computer program products for predicting whether a customer is about to contact customer service and proactively reaching out to the customer.

In an embodiment, methods or systems include extracting numerical features from an interaction between a customer and a merchant during a first time window. Each numerical feature is classified to determine a respective relationship between the numerical features and a set of customer intents. Unstructured data made up of unstructured information regarding the interaction is also extracted from the interaction. Neural networks are used to extract features from the unstructured data. The neural networks are configured to extract features related to the intent of the customer. A numerical regression model is applied to estimate a first set of probabilities that the customer will contact the merchant in a second time window. The second time window occurs after the first time window. The numerical regression model quantifies an impact of each of the numerical features on a respective intent in the set of intents and determines a respective probability from the first set of probabilities that the customer will contact the merchant in the second time window. The neural networks estimate a second set of probabilities that the customer will contact the merchant in the second time window based on the features. The neural networks are further configured to classify the features into the second set of probabilities. The neural networks also combine the first set of probabilities and the second set of probabilities into a third set of probabilities that the customer will contact the merchant in the second time window regarding at least one of the one or more intents. The neural networks are further configured to stack the first set of probabilities and the second set of probabilities into the third set of probabilities. A probability that the customer will contact the merchant within the second time window is estimated based on a combination of the third set of probabilities. The customer is contacted based on the estimated probability.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
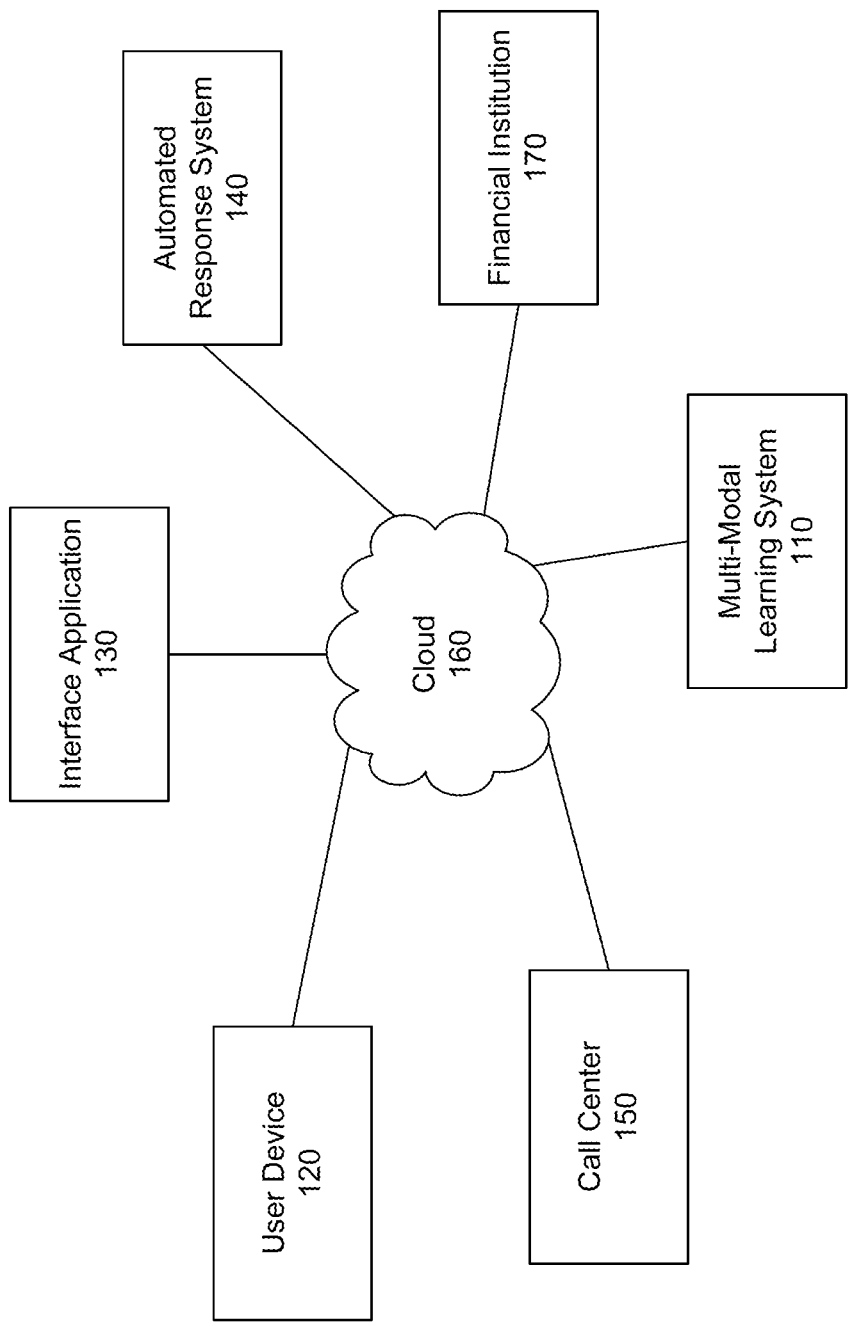
FIG. 1 illustrates a block diagram of a system for providing support to a user accessing services from a financial institution, according to some embodiments.

Provided herein are system, method and/or computer program product embodiments, and/or combinations and sub-combinations thereof, for predicting whether a customer is about to contact customer service and proactively reaching out to the customer.

Businesses can use a variety of prediction tools to anticipate customer needs and when to initiate contact with the customer. These tools can use numerical features of the customer's interactions, such as if, when, or for how long the customer took a particular action. One way of predicting or estimating is to perform a regression analysis. For example, a linear regression can be performed on numerical data to predict a factor, such as a probability that some event will occur. Multiplicative models, such as the classical Cox model, or additive models, such as Aalen's additive model are examples of regression approaches. These models can be trained on a set of data and then used for prediction on observed data. However, such approaches ignore other modalities of data, such as actual content of customer communications. Because such modalities are not easily numerically quantified, methods and systems are needed to provide prediction based on multiple modalities of data.

Multi-modal data takes on multiple forms. For example, data can include numbers, binary indicators, text, audio, images, and/or video. Typical regression models may use numerical data. Numerical data, such as numbers and binary indicators, can describe or be numerical features, which are quantifiable features of an interaction. For example, a numerical feature can be a binary indicator that can indicate whether a customer accessed a help service. As another example, a numerical feature can be an amount of time the customer spends in the help service. As yet another example, a numerical feature can be an indicator as to whether a customer previously contacted a merchant or financial center after making a payment.

Some of the data is more unstructured, such as text, audio, images, and/or video. Some numerical features can be extracted easily. For example, the binary indicator as to whether the customer accessed a help service could be extracted given that a text conversation took place in the help service. As another example, a time length of an audio or video file could indicate the amount of time the customer spent in the help service.

However, the unstructured data includes other useful information that is more difficult to quantify, but which is still informative to a regression model. For example, over the course of a text interaction, a customer may reveal specific information or intent about what they want or what they are going to do without explicitly stating it. In some cases, this requires multiple pieces of data. For example, if a customer discusses payment options in text messages for a help service for a credit card, this could imply that they have questions or concerns about their payment. If they have a payment deadline coming up, these two features together could indicate that the customer needs assistance with their payment. The exact context is not extracted directly from the text or the timing of the payment, but rather is inferred from a set of data. Additionally, this feature is not simply an indicator, but a feature that includes an inferred description of what an intent is.

Regression models are not well-equipped to deal with the content of non-structured data (such as an image) or inferred descriptions that can be extracted from them. While some numerical features can be extracted, this fails to capture all of the information in the unstructured data. The unstructured nature of the data in sources such as text data can make it difficult or expensive, computationally or otherwise, to extract all the information as just numerical features. As a result, a regression model is limited in what data can be used to inform the prediction.

Standard regression models alone can then be insufficient without some method of incorporating the information in unstructured data. By supplementing the numerical data with unstructured data, a multi-modal regression model can be formed that improves the prediction accuracy.

FIG. 1 illustrates a block diagram of a system 100 for providing support to a user accessing services from a financial institution 170, according to some embodiments. A user device 120 communicates with an interface application 130, a call center 150, or financial institution 170. The communications are monitored by a multi-modal learning system 110 and an automated response system 140. In some embodiments, the communication and monitoring occur in or through a cloud 160.

System 100 is exemplary of various online or internet based help services for financial institution 170. In some embodiments, financial institution 170 can also be a business, merchant, or online service provider that has a help system for supporting customers, users, or clients.

User device 120 is a mobile device, computer, laptop, table, smart phone, other network or wireless enabled device, or more than one of these. As a non-limiting example, user device 120 is a laptop and a mobile phone (meaning two separate devices). The user accesses a web-based help service through interface application 130 for financial institution 170 through the laptop and calls, or receives calls from, call center 150 using the mobile phone. In some embodiments, user device 120 can be a customer device for a customer of financial institution 170.

In some embodiments, user device 120 contacts financial institution 170 to access account information. The account information is accessible via a website or application for accessing account information.

In some embodiments, user device 120 communicates with interface application 130 to receive help services for the financial institution 170. The communications may comprise text messages, chat room messages, or search inputs. User device 120 may receive text or chat room messages back or allows the user to browse a help manual.

For example, a customer can access interface application 130 via user device 120 to ask questions and seek help regarding services offered by financial institution 170. The questions and efforts to seek help can be communicated via text messages. Interface application 130 can respond to help answer the questions or offer desired help. The text conversations between the customer and application interface 130 can contain information that describes or relates to customer intent. Further, the amount of time a customer spends communicating with interface application 130 can indicate whether the customer is successful in getting their questions answered or concerns resolved. For example, if a customer spends a long time communicating with interface application 130, this can indicate that the answers being provided are not actually being resolved, which increases the likelihood of a customer calling call center 150.

In some embodiments, user device 120 is used to call or contact a call center 150. The user can speak with or use inputs on user device 120 to interface with the call center.

In some embodiments, interface application 130 is a help system provided by or for financial institution 170. For example, interface application 130 is a text-based help chat that responds to user messages sent via user device 120. In some embodiments, interface application 130 can provide automated responses or services to a user. For example, interface application 130 can be a proprietary system provided by financial institution 170. In some embodiments, interface application 130 includes a help manual or menu for navigating help topics.

Call center 150 provides phone support for users. In some embodiments, call center 150 provides access to representatives who help users resolve issues or problems. In some embodiments, call center 150 may provide automated support, such as an electronic menu that the user can navigate via user device 120. In some embodiments, the electronic menu provides automated solutions to the user prior to allowing the user to speak to a representative.

Multi-modal learning system 110 monitors how user device 120 interfaces with interface application 130, call center 150, and/or financial institution 170. Multi-modal learning system 110 predicts whether the user will contact call center 150 in a given time window. In some embodiments, multi-modal learning system 110 receives multi-modal data from financial institution 170 and trains a multi-modal prediction system on that data. In some embodiments, multi-modal learning system 110 trains itself over time using data monitored through the cloud 160. In some embodiments, multi-modal learning system 110 is implemented in a computer system 400, as further described below in FIG. 4.

Multi-modal learning system 110 receives multi-modal data. Multi-modal is data that is in more than one structure or type, or which has multiple types. For example, multi-modal data includes numerical data, unstructured data, and/or data that can be separated or processed into numerical and unstructured data.

In some embodiments, multi-modal data is generated by different types of interactions between a customer and a business, such as financial institution 170. For example, numerical data can be gathered from interactions between the user device 120 and financial institution 170 to indicate that the customer accessed or contacted a system, when the customer did so, and for how long. As part of the interactions, text messages, audio, and/or video files are generated based on the type of interaction. For example if a customer uses a chat program, text files are generated. If the customer initiates a call, an audio or video recording of the call is generated. As discussed above, text, audio, and video data can be unstructured and require processing to extract features.

In some embodiments, numerical features that are generated alongside or as part of the unstructured data can also be extracted, allowing the unstructured data to be a source of numerical features and unstructured data. For example, the numerical features can be binary indicators that indicate whether a customer contacted a help program that communicates via text messaging and whether the customer mentioned a certain topic, such as blocking a payment, within the text messaging. The content of the text conversation itself can include other information, but is unstructured and needs further processing.

Multi-modal learning system 110 receives the multi-modal data from a variety of sources, such as user device 120, interface application 130, call center 150, and/or financial institution 170. The multi-modal data is generated as part of monitoring customer interaction with various functions and services, such as help services provided by interface application 130 or customer phone calls to call center 150. The multi-modal data is also based on scheduled activities, such as credit card bill deadlines, dates when the customer makes a payment or purchase, or special offers from financial institution 170.

In some embodiments, multi-modal learning system 110 transforms the received multi-modal data into a format for processing. For example, text, audio, image, and/or video files may be transformed from a standard format to a specific format configured to process. As a specific example, textual data can be embedded into an image structure or image-like structure to form the unstructured data. In some embodiments, pages of text can be combined into image-like structures. In some embodiments, the pages of text are combined using natural language processing, such as bidirectional encoder representations from transforms (BERT), embeddings from language models (ELMo), or universal language model fine-tuning (ULMFit).

Multi-modal learning system 110 extracts numerical features from the multi-modal data. The numerical features are classified based on their respective impact on intents of a customer or user. Intents are an intent, goal, or motivation behind a user input. For example, if the user uses user device 120 to access account information from financial institution 170 to find out the user's account balance, the intent is to determine the account balance. As another example, if the user sends a question via user device 120 to interface application 130, the intent is to get an answer to that question. Those skilled in the art will appreciate that user intent for specific actions can be clustered into user intent clusters. Each numerical feature can represent a user action that corresponds to one or more intent clusters and the specific intents for a set of numerical features can be identified, allowing the numerical features to be classified.

Numerical features can be numbers, quantities, flags, or indicators in the data or identifiable from the data. For example, multi-modal data describing a communication between user device 120 and interface application 130 includes a length of time of the communication. Multi-modal learning system 110 extracts this time and assigns it a corresponding label. As another example, a user recently making a payment on an account balance due may trigger a flag that a payment was made at a certain time, and the time, amount, and fact that the payment was made is extracted and each piece of numerical data is assigned an appropriate label.

Multi-modal learning system 110 extracts features from unstructured data. In some embodiments, the features are extracted via a neural network. The neural network receives as an input the unstructured data and outputs the extracted features. In some embodiments, the neural network uses pooling to reduce the dimensionality of the unstructured data. In some embodiments, the neural network is a convolutional neural network that is configured to process the image-like structures that are formed from text in pageviews or image data. The neural network can be trained on sets of unstructured data with known features Multi-modal learning system 110 estimates probabilities of user intent for both numerical data and unstructured data. For numerical data, the classified numerical features are input into a regression model trained for predicting the probabilities of user intent. For unstructured data, a neural network takes the features extracted from the unstructured data and estimates the probabilities of user intent. In some embodiments, the neural network performs the equivalent of a regression analysis on the features.

Multi-modal learning system 110 combines estimates of probabilities of user intent from the numerical and unstructured data into a combined estimate. In some embodiments, a neural network is used to combine the estimates. In some embodiments, the neural network performs the equivalent of a regression analysis on the features.

Multi-modal learning system 110 predicts whether the user will contact or make a call to call center 150. The prediction is based on the combined estimated probability of user intent.

In some embodiments, multi-modal data is gathered over time and provided to multi-modal learning system 110. The multi-modal data contains information about a customer's habits and historical actions. For example, multi-modal data can indicate that a customer has historically called call center 150 after making a payment to financial institution 170. The multi-modal data contains information about a customer's recent actions, such as that a customer recently made a payment. Such information can be processed and analyzed by multi-modal learning system 110 to identify that a customer is likely to make a call to call center 150 after making a payment and that the customer is likely to initiate such a call because the customer recently made a payment.

As another example, historical information aggregated for multiple customers can indicate that customers who seek help via interface application 130 for longer than five minutes are not getting the answer or help that they desire and are likely to initiate a call to call center 150. The multi-modal data can include that the customer has been interacting with interface application 130 for a certain amount of time and multi-modal learning system 110 can identify that the customer is likely to initiate a call to call center 150 as the time gets closer to five minutes.

In some embodiments, multi-modal learning system 110 trains the regression model for numerical data. In some embodiments, multi-modal learning system 110 trains one or more of the neural networks used for extracting features from the unstructured data, estimating the probabilities of user intent from the unstructured data, and the combination of the estimates of probability of user intent from the numerical and unstructured data.

In some embodiments, multi-modal learning system 110 uses one or more neural networks to extract features from the unstructured data, estimate probabilities of user intent for the unstructured data, and combine the estimated probabilities of user intent for the numerical and unstructured data. In some embodiments, the one or more neural networks include a convolutional neural network. In some embodiments, the one or more neural networks use pooling to reduce data dimensionality. In some embodiments, the one or more neural networks include a fully connected network. Those skilled in the art will appreciate that other types of neural networks and neural network configurations may be used to accomplish the same effects as utilizing a convolutional neural network, pooling, a fully connected network, and other features described herein. For example, neural network using pooling could alternatively use existing dimensionality-reducing signal processing techniques as part of the input to the neural network.

Automated response system 140 is a system for contacting a user regarding an issue. In some embodiments, automated response system 140 contacts user device 120 when multi-modal learning system 110 predicts that the probability of the user contacting call center 150 is greater than a threshold percentage. In some embodiments, automated response system 140 initiates a call to user device 120 and provides automated communication to help the user resolve a problem or otherwise satisfy a predicted user intent. In some embodiments, automated response system 140 initiates a call to user device 120 and transfers user device 120 to a representative, such as a representative working at call center 150. In some embodiments, automated response system 140 is implemented in computer system 400, as further described below in FIG. 4. In some embodiments, automated response system 140 accesses a phone number for user device 120 that is available to financial institution 170, such as via account information of the user.

Cloud 160 is a network, distributed servers, or networks connected via the internet, wireless communication, or phone lines. For example, financial institution 170 has servers that host various websites and applications for financial institution 170, provide interface application 130, and run multi-modal learning system 110 and automated response system 140. These servers are connected to or can form part of cloud 160. Those of skill in the art will understand the various configurations, components, and features of cloud 160.

Figure 2:
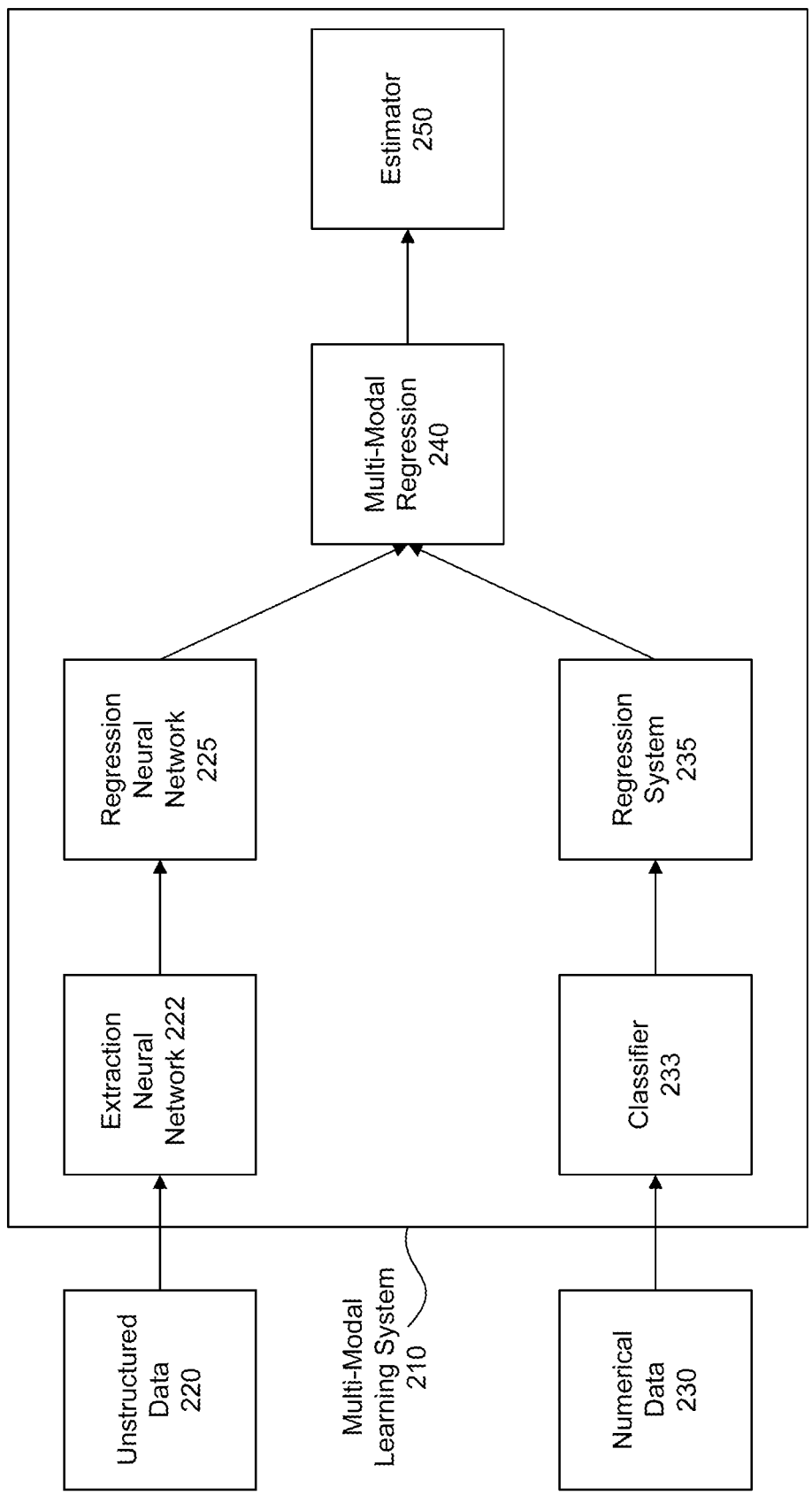
FIG. 2 illustrates a block diagram for a machine learning system for estimating customer intent to contact a merchant, according to some embodiments.

FIG. 2 illustrates a block diagram for a machine learning system 200 for estimating customer intent to contact a merchant, according to some embodiments. Machine learning system 200 includes a multi-modal learning system 210 that receives, as input, unstructured data 220 and numerical data 230. Multi-modal learning system 210 is an embodiment of some or all of multi-modal learning system 110 as described above for FIG. 1 and, in some embodiments, is implemented in computer system 400, as described below in FIG. 4.

Unstructured data 220 is based on interactions observed or monitored between user device 120 and various help services, websites, and/or applications provided by a merchant or financial institution 170, such as interface application 130, financial institution 170, and/or call center 150. Unstructured data 220 is extracted from the interactions and includes unstructured information regarding the interaction. Unstructured data 220 is data that may be analyzed or further processed to extract or identify relevant features. For example, unstructured data 220 can be a text message sent by the user via user device 120 to interface application 130, an audio file of a phone call from user device 120 to call center 150, and/or a video file of a video chat between a user on user device 120 and a representative of financial institution 170. In some embodiments, unstructured data 220 varies based on the source platform. For example, for each different platform on user device 120, the format of the relevant data varies. The variation can increase the complexity of processing the data and, in some cases, results in a lack of common data structure between different source platforms, hence the data being unstructured. In some embodiments, unstructured data 220 includes textual data that has been embedded into an image structure.

Numerical data 230 is data that can be expressed in specific values with a label, such as an indicator that the user sent a message to interface application 130 or accessed account information at financial institution 170, or an amount of time that the user spent using interface application 130. In some embodiments, numerical data is explicitly captured as part of interactions observed or monitored between user device 120 and various help services, websites, and/or applications provided by a merchant or financial institution 170, such as interface application 130, financial institution 170, and/or call center 150. In some embodiments, the numerical data is extracted, calculated, or inferred from the interactions.

Unstructured data 220 and numerical data 230 together form multi-modal data, which is data that is in more than one structure or type, or which has multiple types. For example, multi-modal data includes numerical, unstructured data, and data that can be separated or processed into numerical and unstructured data.

In some embodiments, the multi-modal data includes time spent by a customer or user in a help application, such as interface application 130, time to a scheduled customer deadline, such as payment deadlines or dates of monthly statements, dispute transactions initiated by the customer, historical data of customer initiated actions, such as phone calls to call center 150 or messages to interface application 130, and records of past instances where the customer contacted financial institution 170. Other examples of the multi-modal data include information regarding seasonal offers, such as times of year for sales and special offers or increases in credit limits, periodic patterns, such as actions that are limited to a certain number of times in a given time period (for example, once every six months) or periodic payments for subscriptions, chronic patterns, such as contacting financial institution 170 after making a late payment to get a late fee waived, timing-based or expiring promotional offers made by financial institution 170, and changes to user account settings, such as change legal name, contact information changes, or automated updates to account settings (for example, a regularly scheduled increase in a credit limit).

Extraction neural network 222 extracts features from the unstructured data. Extraction neural network 222 is configured to extract features, such as patterns or contents, related to the one or more intents of the customer in a set of customer intents. In some embodiments, Extraction neural network 222 uses pooling to reduce dimensionality of the unstructured data. In some embodiments, extraction neural network 222 is fully connected.

Regression neural network 225 estimates a set of probabilities of customer intents. The customer intents are intents from the intent clusters that relate to whether the customer will contact the merchant or financial institution 170 during a time window. Regression neural network 225 determines the set of probabilities based on the features extracted from unstructured data 220. In some embodiments, regression neural network 225 is a convolutional neural network. In some embodiments, regression neural network 225 uses pooling to reduce data dimensionality. In some embodiments, regression neural network 225 is fully connected.

Classifier 233 classifies each of the numerical features in numerical data 230 to determine a relationship between the numerical features and a set of intents. These intents are from clusters of customer intents. In some embodiments, classifier 233 uses weight of evidence (WoE) and/or information value (IV) to perform the classification. WoE is used to determine the relationship between different outcomes (such as whether the customer called call center 150) for the numerical features. In some embodiments, the WoE is used to classify together or combine different numerical features that have similar relationships under WoE. IV determines the relative importance of each numerical feature based on the WoE value, allowing the numerical features to be ranked. In some embodiments, the ranking determines how the numerical features are ordered and weighted in a regression model.

Regression system 235 estimates a set of probabilities that the customer will contact the merchant during a time window. Each probability is a probability of a user or customer intent to contact a merchant or financial institution 170 in a time window. Regression system 235 uses a regression model that is configured to quantify an impact of each numerical feature on each probability. In some embodiments, regression system 235 uses a multiplicative regression model, such as a classical Cox model, or an additive regression model, such as Aalen's additive model.

Multi-modal regression 240 combines the set of probabilities from regression system 235 and the set of probabilities from regression neural network 225 into a third set of probabilities. Each of the combined probabilities is the probability of customer intent to contact the merchant or financial institution 170 in a time window. Multi-modal regression 240 can be performed by a neural network configured to stack the two sets of probabilities into the third set of probabilities. In some embodiments, the neural network is a convolutional neural network. In some embodiments, the neural network is fully connected. In some embodiments, the combination of the two estimates improves the accuracy of the estimate of the probability of user intent. In some embodiments, multi-modal regression 240 stacking the probabilities increases the accuracy of estimated probabilities.

Estimator 250 combines the third set of probabilities into an estimated probability that the customer will contact the merchant or financial institution 170 in the time window. In some embodiments, estimator 250 compares each probability in the third set of probabilities and selects the maximum probability of customer intent. In some embodiments, estimator 250 combines the third set of probabilities into an overall probability that the customer will contact the merchant or financial institution 170 in the time window.

In some embodiments, the neural networks for extraction neural network 222, regression neural network 225, and multi-modal regression 240 are one or more neural networks. For example, in some embodiments, each of extraction neural network 222, regression neural network 225, and multi-modal regression 240 has its own neural network. As another example, in some embodiments, extraction neural network 222 and regression neural network 225 are combined into a single neural network that performs the functions of both extraction neural network 222 and regression neural network 225.

In some embodiments, regression system 235 and the one or more neural networks for extraction neural network 222, regression neural network 225, and multi-modal regression 240 are trained. Training can be performed using historical numerical data and historical unstructured data from one or more customers. The historical data can be tied to actual customer actions, such as whether a customer associated with a set of historical numerical data and historical unstructured data actually contacted call center 150.

In some embodiments, the historical numerical data is classified using classifier 233 prior to training regression system 235. In some embodiments, features are extracted from the historical unstructured data and the features are used to train extraction neural network 222. In some embodiments, a trained extraction neural network 222 is used to classify the features and the classified features are used to train regression neural network 225. In some embodiments, the outputs of trained regression neural network 225 and regression system 235 are then used to train multi-modal regression 240.

Figure 3:
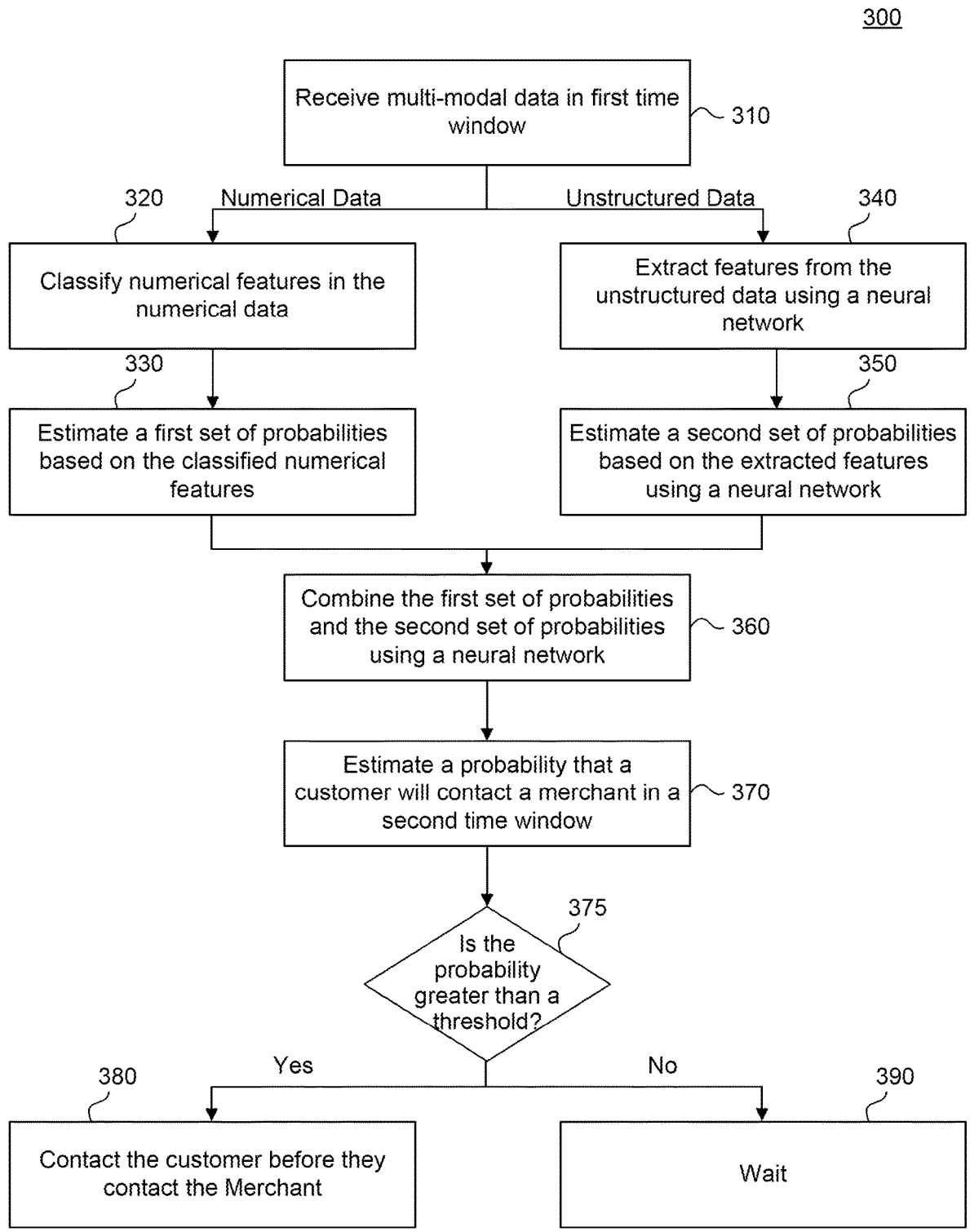
FIG. 3 is a flowchart illustrating a method for determining whether a merchant should contact a customer, according to some embodiments.

FIG. 3 is a flowchart illustrating a method 300 for determining whether a merchant should contact a customer, according to some embodiments. In some embodiments, method 300 is performed by multi-modal learning systems 110 or 210. As an example, method 300 is described in the context of multi-modal learning system 210.

In 310, multi-modal learning system 210 receives multi-modal data in a first time window. In some embodiments, the multi-modal data is based on, or extracted from, interactions between a customer or user and a merchant or financial institution 170, including help services offered by the merchant or financial institution 170, such as an interface application 130. The user performs the interactions using user device 120. The first time window is a time window during which interactions between the customer and the merchant or financial institution 170 are being monitored.

In some embodiments, the multi-modal data includes numerical data 230 and unstructured data 220. Numerical data 230 includes numerical features extracted, or determined from, the interactions between the customer and the merchant or financial institution 170. In some embodiments, unstructured data 220 includes text, images, video, and/or audio data extracted from the interactions between the customer and the merchant or financial institution 170. In some embodiments, the unstructured data has been formatted or processed for use in method 300. For example, in some embodiments, multi-modal learning system 110 processes textual data by embedding the textual data into an image structure to form unstructured data 220.

Operation 310 separates the multi-modal data into the different modalities. Numerical data 230 is sent to operation 320 and unstructured data 220 is sent to operation 340.

In 320, classifier 233 classifies the numerical features in numerical data 230. The numerical features are classified based on their contribution to one or more customer intents. The contribution describes a relationship between the numerical feature and a customer intent. For example, if the numerical feature is an indicator that the customer's bill was recently paid late, this numerical feature can strongly contribute to an intent for a customer to ask for a waiver of a late fee. The relationship of this numerical feature is that it is important to the intent it contributes to, while for other intents, the numerical feature is less important. The customer intents can be from a set of intent clusters. Each intent describes an intent of the customer when taking one or more actions, such as those described by the numerical features. For example, a customer accessing their account statement may intend to cancel a payment, determine a payment deadline, or check their available credit. An indicator or flag that the customer accessed their account statement is the corresponding or related numerical feature. When a numerical feature describes a customer interaction that strongly correlates or relates to a specific customer intent, then that numerical feature is classified as contributing more to the outcome.

In 330, regression system 235 estimates a first set of probabilities based on the classified numerical features. Each probability is a probability that the customer will contact the merchant or financial institution 170 during a second time window with a specific intent. The second time window occurs after the first time window, allowing the interactions that result in numerical data 230 to drive the probabilities of customer action during the second time window. In some embodiments, operation 330 is performed using a regression model that is trained or configured to quantify an impact of each of the numerical features on each probability in the first set of probabilities.

In 340, extraction neural network 222 extracts features from unstructured data 220 using a neural network. The features are contents and patterns of the unstructured data that are related to the customer intents.

In 350, regression neural network 225 estimates a second set of probabilities based on the extracted features using a neural network. Each probability is a probability that the customer will contact the merchant or financial institution 170 during the second time window with a specific intent. The second time window occurs after the first time window, allowing the interactions that result in unstructured data 220 to drive the probabilities of customer action during the second time window. In some embodiments, the neural network classifies the features extracted into the second set of probabilities;

The first set of probabilities from operation 330 and the second set of probabilities from operation 350 both feed into operation 360.

In 360, multi-modal regression 240 combines the first set of probabilities and the second set of probabilities using a neural network. The combination results in a third set of probabilities that the customer will contact the merchant in the second time window regarding at least one of the one or more intents. In some embodiments, the first and second sets of probabilities are combined by stacking the first set of probabilities and the second set of probabilities into the third set of probabilities.

In 370, estimator 250 estimates a probability that the customer will contact the merchant or financial institution 170 in the second time window. The probability is estimated based on a combination of the third set of probabilities. In some embodiments, the probability is estimated by combining probabilities in the third set of probabilities. In some embodiments, the probability is set to the highest probability in the third set of probabilities.

In 375, multi-modal learning system 210 checks whether the probability is greater than a threshold. The threshold is set to control when to contact the customer or user. If the probability is greater than the threshold, then method 300 proceeds to operation 380. If the probability is not greater than the threshold, then method 300 proceeds to operation 390.

In 380, automated response system 140 contacts the customer before they contact the merchant or financial institution 170. In some embodiments, contacting the customer is initiating a phone call, sending a text, sending an email, or starting a chat-bot conversation with the customer. In some embodiments, automated response system 140 initiates the contact. In some embodiments, automated response system 140 causes call center 150 to initiate a phone call. In some embodiments, multi-modal learning system 110 or 210 causes automated response system 140 to execute operation 380.

In 390, multi-modal learning system 210 waits. While waiting, multi-modal learning system 210 monitors interactions between the customer or user and the merchant or financial institution 170. If new multi-modal data is received, multi-modal learning system 210 proceeds back to operation 310 and updates the probabilities based on the additional data. If a new time window is started or begins, method 300 begins again at operation 310 using multi-modal data in the new time window.

Figure 4:
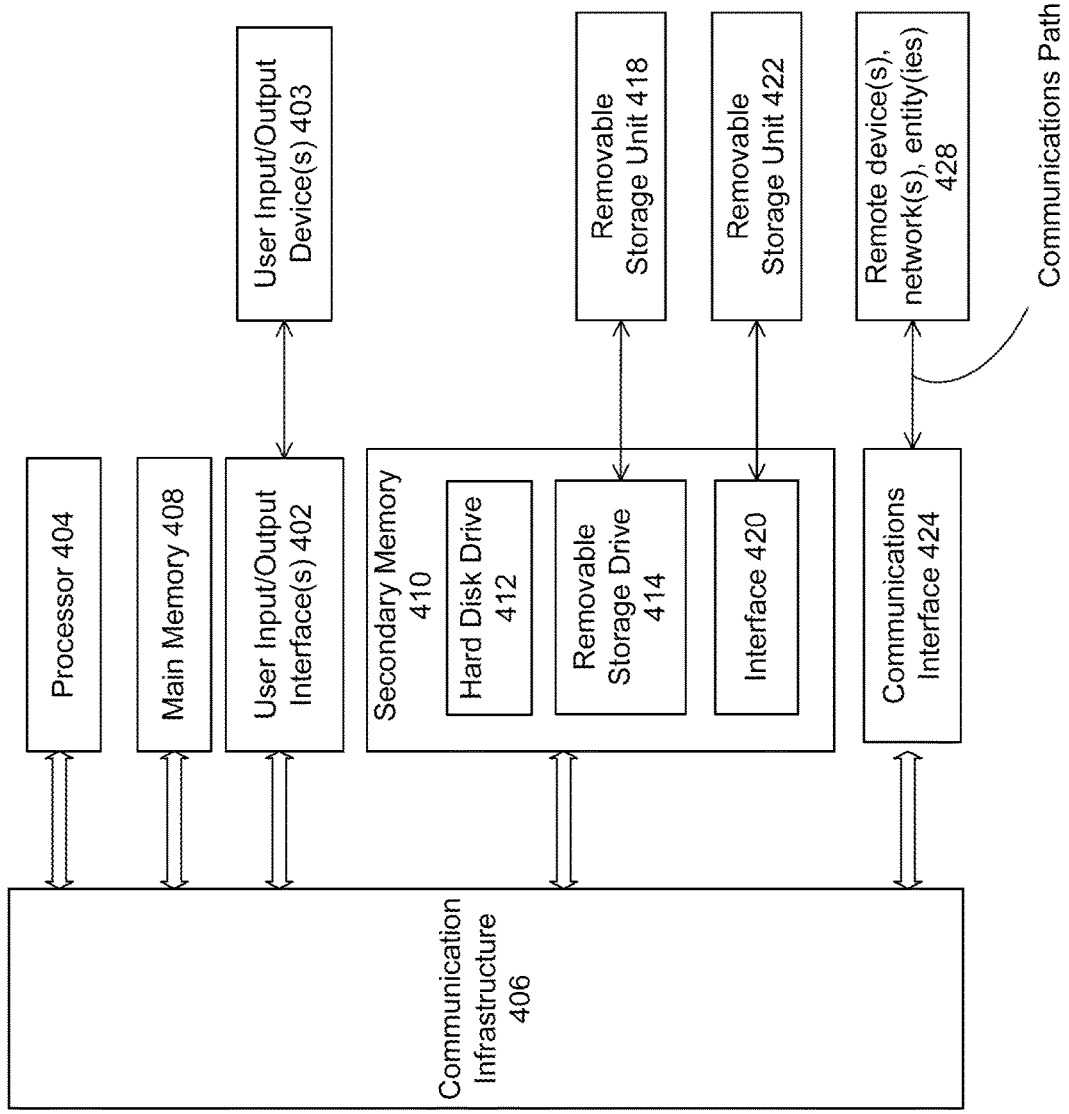
FIG. 4 depicts an example computer system useful for implementing various embodiments.

FIG. 4 depicts an example computer system 400 useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method, comprising:
   extracting, by at least one processor, numerical features from an interaction between a customer and a merchant during a first time window, and one or more historical actions between the customer and the merchant prior to the interaction;
   classifying, by the at least one processor, each of the numerical features to determine a respective relationship between the numerical features and a set of intents from one or more intents of the customer;
   extracting, by the at least one processor, unstructured data from the interaction, wherein the unstructured data comprises information regarding the interaction;
   extracting, by the at least one processor, features from the unstructured data using one or more neural networks configured to extract features related to the one or more intents of the customer;
   estimating, by a numerical regression model, a first set of probabilities that the customer will contact the merchant in a second time window occurring after the first time window, wherein the numerical regression model quantifies an impact of each of the numerical features on a respective intent in the set of intents and determines a respective probability from the first set of probabilities that the customer will contact the merchant in the second time window;
   estimating, by the one or more neural networks, a second set of probabilities that the customer will contact the merchant in the second time window based on the features, wherein the one or more neural networks classify the features into the second set of probabilities;
   combining, by the one or more neural networks, the first set of probabilities and the second set of probabilities into a third set of probabilities that the customer will contact the merchant in the second time window regarding at least one of the one or more intents, wherein the one or more neural networks combine the first set of probabilities and the second set of probabilities into the third set of probabilities; and initiating, by the at least one processor, a contact with the customer based on an estimated probability that the customer will contact the merchant within the second time window, wherein the estimated probability is based on a combination of the third set of probabilities.

2. The method of claim 1, wherein the initiating comprises initiating a phone call to the customer.

3. The method of claim 1, wherein:
the features comprise contents and patterns of the unstructured data related to the one or more intents; and
the extracting the features from the unstructured data comprises extracting, by the one or more neural networks, the contents and the patterns.

4. The method of claim 1, further comprising:
classifying, by the at least one processor, each of a set of historical numerical features to determine an additional respective relationship between each historical numerical feature and respective sets of historical intents from additional one or more intents of one or more customers, wherein the set of historical numerical features are from respective interactions between the one or more customers and the merchant before the first time window; and
training, by the at least one processor, the numerical regression model based on the set of historical numerical features, the additional respective relationships, the respective sets of historical intents, and whether the one or more customers contacted the merchant regarding a corresponding intent for that customer within a respective time window.

5. The method of claim 1, further comprising training, by the at least one processor, the one or more neural networks to:
extract the features in the unstructured data related to the customer having the one or more intents in the unstructured data based on historical unstructured data regarding historical interactions between the customer and the merchant before the first time window, wherein the historical unstructured data comprises information regarding the historical interactions;
classify the features into the second set of probabilities based on historical features extracted from the historical unstructured data regarding respective interactions between one or more customers and the merchant before the first time window and whether the one or more customers contacted the merchant regarding a corresponding intent for that customer within a respective time window; and
stack the first set of probabilities and the second set of probabilities into the third set of probabilities based on:
a first historical set of probabilities generated using the numerical regression model on historical numerical features from the respective interactions;
a second historical set of probabilities generated using the one or more neural networks to binary classify the historical features into the second historical set of probabilities, wherein the historical features are extracted from historical unstructured data regarding the respective interactions; and
whether the one or more customers contacted the merchant regarding the corresponding intent for that customer within the respective time window.

6. The method of claim 1, further comprising embedding, by the at least one processor, textual data from the interaction into an image structure to form the unstructured data.

7. The method of claim 6, further comprising receiving, by the at least one processor, the numerical features and the textual data from the interaction, the numerical features and the textual data selected from a group consisting of: time spent by the customer in a help application, time to a scheduled customer deadline, dispute transactions initiated by the customer, historical data of customer initiated actions, and records of past instances where the customer contacted the merchant.

8. A system comprising:
one or more processors;
memory communicatively coupled to the one or more processors, the memory storing instructions which, when executed by the one or more processors, cause the one or more processors to:
extract numerical features from an interaction between a customer and a merchant during a first time window, and one or more historical actions between the customer and the merchant prior to the interaction;
classify each of the numerical features to determine a respective relationship between the numerical feature and a set of intents from one or more intents of the customer;
extract unstructured data from the interaction, wherein the unstructured data comprises information regarding the interaction;
extract features from the unstructured data using one or more neural networks configured to extract features related to the one or more intents of the customer;
estimate, by a numerical regression model, a first set of probabilities that the customer will contact the merchant in a second time window occurring after the first time window, wherein the numerical regression model quantifies an impact of each of the numerical features on a respective intent in the set of intents and determines a respective probability from the first set of probabilities that the customer will contact the merchant in the second time window;
estimate, by the one or more neural networks, a second set of probabilities that the customer will contact the merchant in the second time window based on the features, wherein the one or more neural networks classify the features into the second set of probabilities; and
combine, by the one or more neural networks, the first set of probabilities and the second set of probabilities into a third set of probabilities that the customer will contact the merchant in the second time window regarding at least one of the one or more intents, wherein the one or more neural networks combine the first set of probabilities and the second set of probabilities into the third set of probabilities; and
initiate, by the one or more processors, a contact with the customer based on an estimated probability that the customer will contact the merchant within the second time window, wherein the estimated probability is based on a combination of the third set of probabilities.

9. The system of claim 8, wherein the instructions further cause the one or more processors to contact the customer by initiating a phone call to the customer.

10. The system of claim 8, wherein:
the features comprise contents and patterns of the unstructured data related to the one or more intents; and
the instructions further cause the one or more processors to extract the contents and the patterns from the unstructured data using the one or more neural networks.

11. The system of claim 8, wherein the instructions further cause the one or more processors to:
classify each of a set of historical numerical features to determine an additional respective relationship between each historical numerical feature and respective sets of historical intents from additional one or more intents of one or more customers, wherein the set of historical numerical features are from respective interactions between the one or more customers and the merchant before the first time window; and
train the numerical regression model based on the set of historical numerical features, the additional respective relationships, the respective sets of historical intents, and whether the one or more customers contacted the merchant regarding a corresponding intent for that customer within a respective time window.

12. The system of claim 8, wherein the instructions further cause the one or more processors to:
extract the features in the unstructured data related to the customer having the one or more intents in the unstructured data based on historical unstructured data regarding historical interactions between the customer and the merchant before the first time window, wherein the historical unstructured data comprises information regarding the historical interactions;
classify the features into the second set of probabilities based on historical features extracted from the historical unstructured data regarding respective interactions between one or more customers and the merchant before the first time window and whether the one or more customers contacted the merchant regarding a corresponding intent for that customer within a respective time window; and
stack the first set of probabilities and the second set of probabilities into the third set of probabilities based on:
a first historical set of probabilities generated using the numerical regression model on historical numerical features from the respective interactions;
a second historical set of probabilities generated using the one or more neural networks to binary classify the historical features into the second historical set of probabilities, wherein the historical features are extracted from historical unstructured data regarding the respective interactions; and
whether the one or more customers contacted the merchant regarding the corresponding intent for that customer within the respective time window.

13. The system of claim 8, wherein the instructions further cause the one or more processors to embed textual data from the interaction into an image structure to form the unstructured data.

14. The system of claim 13, wherein the instructions further cause the one or more processors to receive the numerical features and the textual data from the interaction, the numerical features and the textual data selected from a group consisting of: time spent by the customer in a help application, time to a scheduled customer deadline, dispute transactions initiated by the customer, historical data of customer initiated actions, and records of past instances where the customer contacted the merchant.

15. A non-transitory computer readable storage medium having computer readable code thereon, the non-transitory computer readable storage medium including instructions configured to cause a computer system to perform operations, comprising:
extracting numerical features from an interaction between a customer and a merchant during a first time window, and one or more historical actions between the customer and the merchant prior to the interaction;
classifying each of the numerical features to determine a respective relationship between the numerical feature and a set of intents from one or more intents of the customer;
extracting unstructured data from the interaction, wherein the unstructured data comprises information regarding the interaction;
extracting features from the unstructured data using one or more neural networks configured to extract features related to the one or more intents of the customer;
estimating, by a numerical regression model, a first set of probabilities that the customer will contact the merchant in a second time window occurring after the first time window, wherein the numerical regression model quantifies an impact of the numerical features on a respective intent in the set of intents and determines a respective probability from the first set of probabilities that the customer will contact the merchant in the second time window;
estimating, by the one or more neural networks, a second set of probabilities that the customer will contact the merchant in the second time window based on the features, wherein the one or more neural networks classify the features into the second set of probabilities;
combining, by the one or more neural networks, the first set of probabilities and the second set of probabilities into a third set of probabilities that the customer will contact the merchant in the second time window regarding at least one of the one or more intents, wherein the one or more neural networks combine the first set of probabilities and the second set of probabilities into the third set of probabilities; and
initiating, by the computer system, a contact with the customer based on an estimated probability that the customer will contact the merchant within the second time window, wherein the estimated probability is based on a combination of the third set of probabilities.

16. The non-transitory computer readable storage medium of claim 15, wherein the operations further comprise initiating a phone call to contact the customer.

17. The non-transitory computer readable storage medium of claim 15, wherein:
the operations further comprise extracting contents and features from the unstructured data using the one or more neural networks; and
the features comprise the contents and patterns of the unstructured data related to the one or more intents.

18. The non-transitory computer readable storage medium of claim 15, wherein the operations further comprise:
classifying each of a set of historical numerical features to determine an additional respective relationship between each historical numerical feature and respective sets of historical intents from additional one or more intents of one or more customers, wherein the set of historical numerical features are from respective interactions between the one or more customers and the merchant before the first time window; and training the numerical regression model based on the set of historical numerical features, the additional respective relationships, the respective sets of historical intents, and whether the one or more customers contacted the merchant regarding a corresponding intent for that customer within a respective time window.

19. The non-transitory computer readable storage medium of claim 15, wherein the operations further comprise training the one or more neural networks to:
- extract the features in the unstructured data related to the customer having the one or more intents in the unstructured data based on historical unstructured data regarding historical interactions between the customer and the merchant before the first time window, wherein the historical unstructured data comprises information regarding the historical interactions;
- classify the features into the second set of probabilities based on historical features extracted from the historical unstructured data regarding respective interactions between one or more customers and the merchant before the first time window and whether the one or more customers contacted the merchant regarding a corresponding intent for that customer within a respective time window; and
- stack the first set of probabilities and the second set of probabilities into the third set of probabilities based on:
  - a first historical set of probabilities generated using the numerical regression model on historical numerical features from the respective interactions;
  - a second historical set of probabilities generated using the one or more neural networks to binary classify the historical features into the second historical set of probabilities, wherein the historical features are extracted from historical unstructured data regarding the respective interactions; and
  - whether the one or more customers contacted the merchant regarding the corresponding intent for that customer within the respective time window.

20. The non-transitory computer readable storage medium of claim 15, the operations further comprising embedding textual data from the interaction into an image structure to form the unstructured data.

21. The method of claim 1, wherein the initiating comprises providing automated communication to help the customer with at least one of the one or more intents.

* * * * *